United States Patent [19]

Zabcik

[11] 4,106,779
[45] Aug. 15, 1978

[54] AUTOMATIC SEQUENTIAL DUAL ACTION SEALING SYSTEM

[75] Inventor: Clarence John Zabcik, Houston, Tex.

[73] Assignee: Nl Hycalog, Houston, Tex.

[21] Appl. No.: 554,453

[22] Filed: Mar. 3, 1975

[51] Int. Cl.² .................. F16J 15/54; F16J 15/56
[52] U.S. Cl. ........................... 277/27; 277/59;
  277/73; 277/177; 92/86; 64/23; 175/293;
  285/351
[58] Field of Search ............... 277/27, 3, 28, 29, 30,
  277/33, 9, 36, 37, 50, 59, 73, 74–75, 76, 103,
  177, 173; 92/86; 64/23; 175/293, 321; 285/106,
  351

[56] References Cited

U.S. PATENT DOCUMENTS

| | | | |
|---|---|---|---|
| 2,930,636 | 3/1960 | Tracy | 277/27 |
| 2,996,131 | 8/1961 | Greenwood | 175/293 |
| 3,153,160 | 10/1964 | Carle | 277/3 X |
| 3,406,537 | 10/1968 | Falkner | 64/23 |
| 3,504,936 | 4/1970 | Brown et al. | 285/351 X |
| 3,588,124 | 6/1971 | Guinard | 277/59 X |
| 3,776,558 | 12/1973 | Maurer et al. | 277/9 |
| 3,949,150 | 4/1976 | Mason et al. | 64/23 X |

Primary Examiner—Robert S. Ward, Jr.
Attorney, Agent, or Firm—Arnold, White & Durkee

[57] ABSTRACT

A shock absorbing subassembly with a body, a mandrel slidably and non-rotatively received in the body, dampening means therebetween, an upper seal above the dampening means and a floating seal therebelow for maintaining an oil bath between the body and the mandrel, a primary seal between the body and the mandrel below the floating seal, and a secondary seal actuated upon a predetermined magnitude of leakage past the primary seal to sequentially establish another seal between the body and the mandrel above the primary seal and below the floating seal.

5 Claims, 4 Drawing Figures

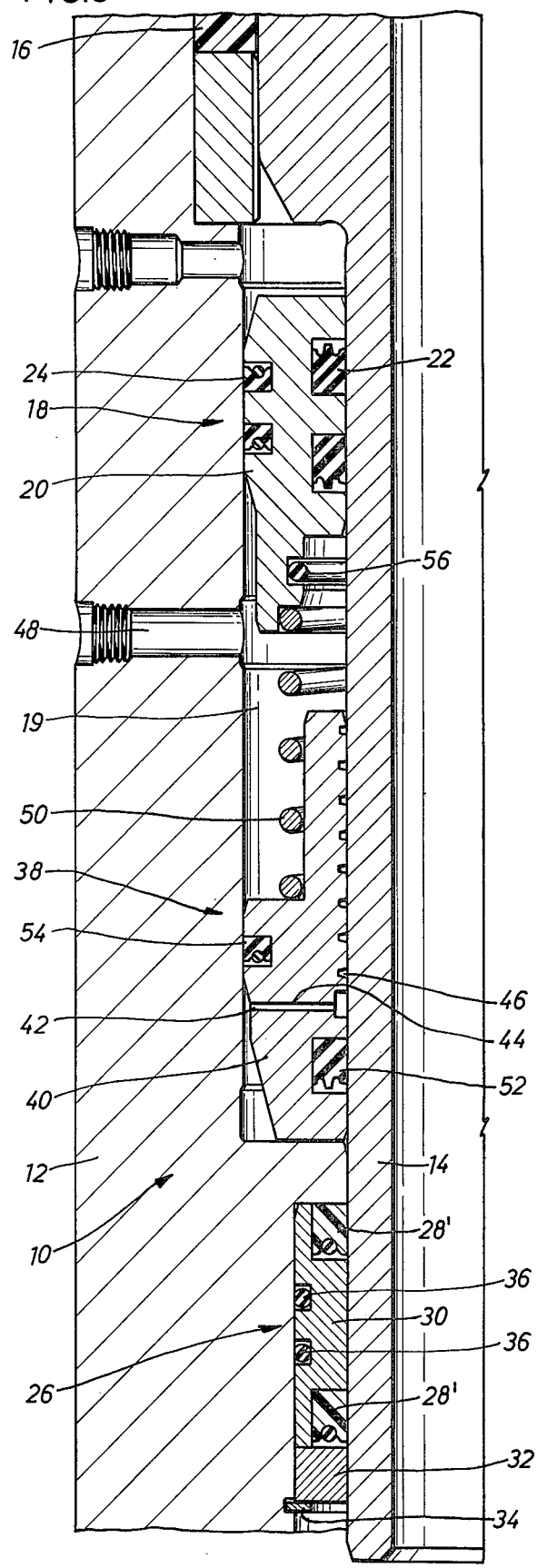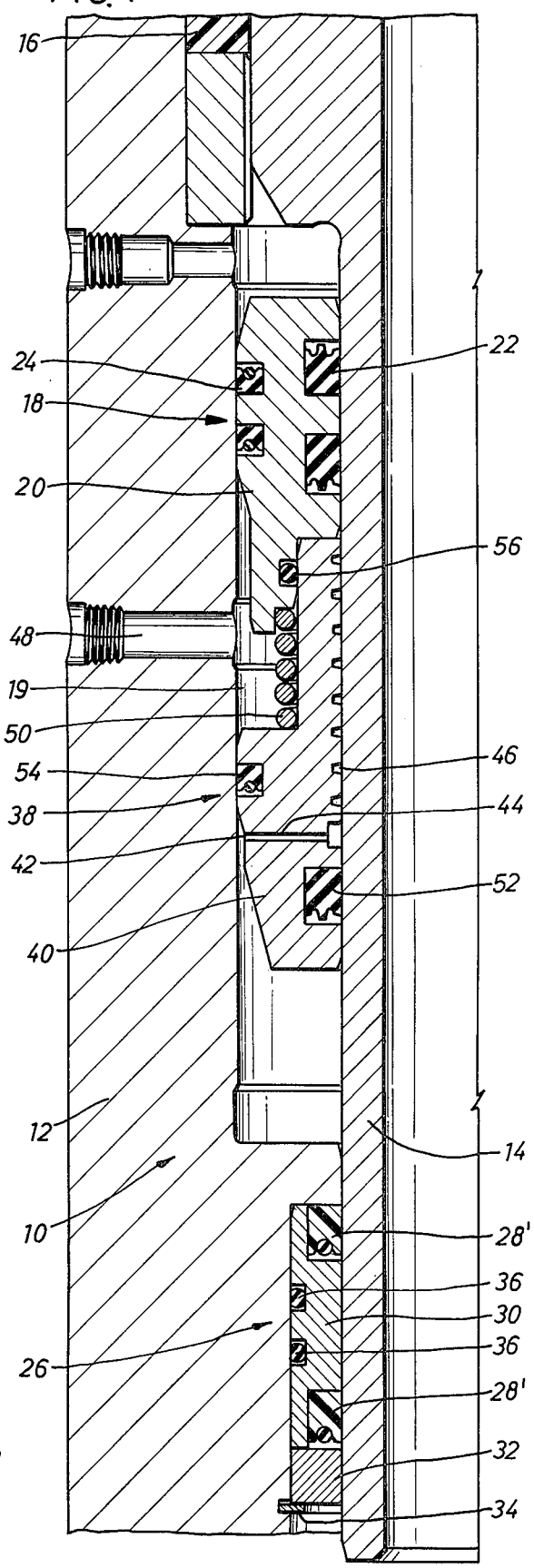

AUTOMATIC SEQUENTIAL DUAL ACTION SEALING SYSTEM

BACKGROUND OF THE INVENTION

This invention relates generally to seals, and more particularly to an automatic sequential dual action sealing system especially useful in a shock absorbing subassembly used in a downhole oil well drilling.

Shock absorbing subassemblies, such as that disclosed in U.S. Pat. No. 3,406,537 issued to C. B. Falkner, Jr. on Oct. 22, 1968, have been used for many years to absorb shock and vibration between a drill bit and a drill string. However, such shock absorbing subassemblies have been limited insofar as the pressure of the drilling fluid is concerned and insofar as their useful lives are concerned, both limitations being due at least in part to the sealing systems heretofore used. The present invention which arose in the context of the need for a better sealing system in a downhole tool, particularly a shock absorbing subassembly requiring a high pressure seal between telescoping male and female cylindrical members which undergo limited relative axial movement, is not limited to such applications; rather, it is useful in providing an effective seal between male and female cylindrical members in general.

Dual seals per se have been disclosed in U.S. Pat. Nos. 3,588,124 and 3,776,588. However, the first of those is not automatic, and the second requires very complex structure. The present invention provides a simple automatic sequential dual action sealing system. Other references of general interest for background purposes are U.S. Pat. Nos. 2,786,534, 3,504,936, 3,752,507, and 3,807,513.

SUMMARY OF THE INVENTION

Briefly, this invention comtemplates a primary seal between male and female cylindrical members and a secondary seal in the form of a sliding piston with a small orifice therethrough so that small leaks past the primary seal will pass through the orifice and large leaks will cause the piston to slide to a second position where it will establish a second seal.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein:

FIGS. 3 and 4 are enlarged elevation views, in section, of a portion of a shock absorbing subassembly with another embodiment of the automatic sequential dual action sealing system of the present invention in its first and second stages, respectively.

DESCRIPTION OF THE PREFERRED EMBODIMENTS

Figure 1:
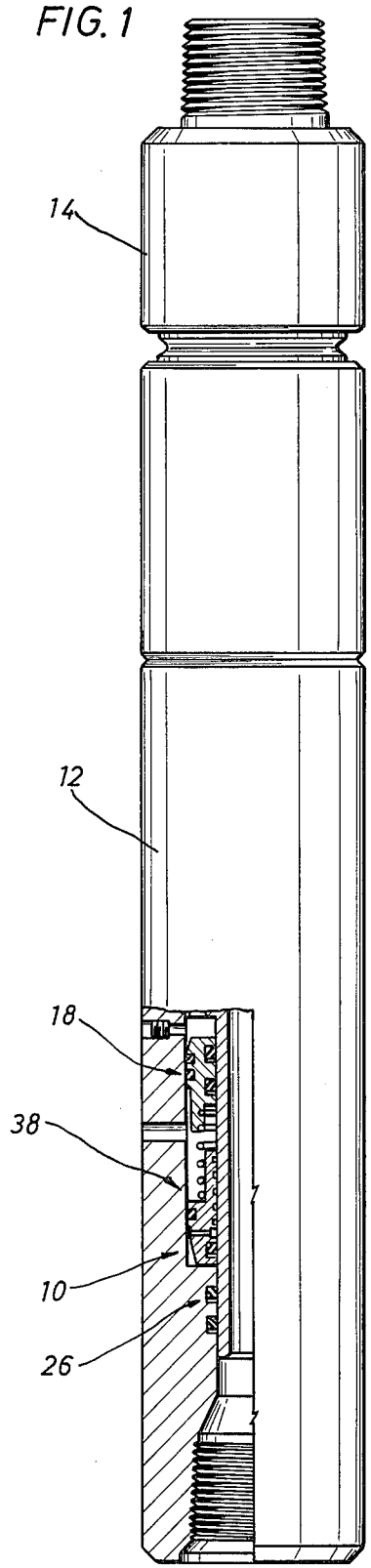
FIG. 1 is an elevation view, partly in section, of a shock absorbing subassembly in accordance with the present invention.

Referring now to the drawings wherein like reference characters designate identical or corresponding parts throughout the several views, and more particularly to FIG. 1 thereof wherein the dual action sealing system of the present invention, indicated generally by reference numeral 10, is shown embodied in a shock absorbing subassembly of the type disclosed in U.S. Pat. No. 3,406,537 issued to C. B. Falkner, Jr. on Oct. 22, 1968.

The shock absorbing subassembly, described in greater detail in the aforementioned patent hereby incorporated by reference herein, includes a body or female cylindrical member 12 in which is slidably and non-rotatively positioned a mandrel or male cylindrical member 14. As shown in FIGS. 3 and 4, a dampening means 16 between the body and the mandrel is maintained in a protective oil bath by means of (a) an upper seal means (not shown) for providing a fluid tight seal between the body and the mandrel above the dampening means and (b) a floating seal means 18 positioned in an annular cylindrical chamber 19 between the body and the mandrel for providing a fluid tight seal therebetween below the dampening means.

Floating seal means 18 includes an annular piston 20 having a plurality of inner seals 22 and outer seals 24 positioned in internal and external annular grooves formed in the piston. Seals 22 and 24 may be selected from a number of standard, commercially available seals, such as those sold by Johns-Manville and Parker under the trademarks Deep Base Uneepac and PolyPak.

Figure 2:
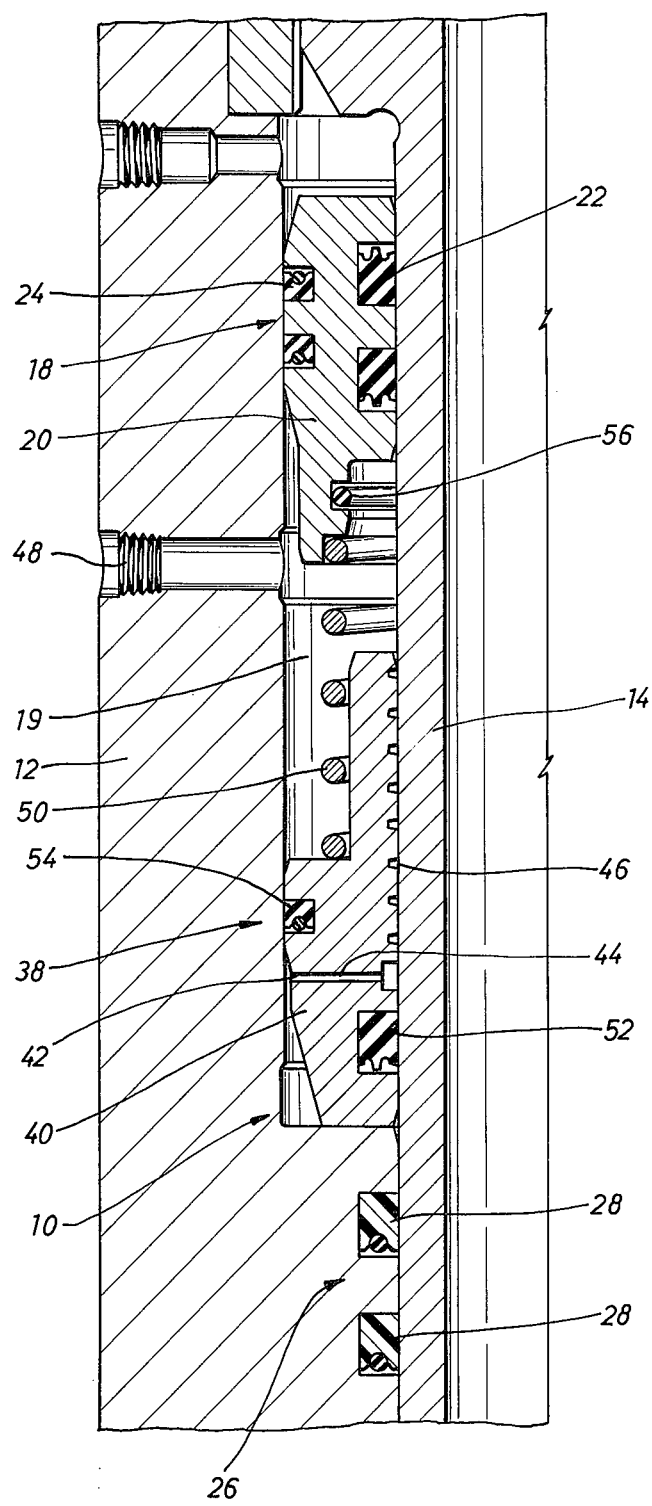
FIG. 2 is an enlarged elevation view, in section, of a portion of a shock absorbing subassembly with one embodiment of the automatic sequential dual action sealing system of the present invention.

Referring now to the embodiment shown in FIG. 2 there is shown a primary sealing means 26 for providing a fluid tight seal between body 12 and mandrel 14. Primary sealing means 26 includes a plurality of conventional seals 28 which may be of the aforementioned type. If seals 28 are fairly soft and pliable, they may be easily inserted in internal annular grooves in body 12 as shown in FIG. 2. If sealing means 26 includes a plurality of hard and rigid seals 28, it may be desirable, in order to facilitate assembly, to utilize the embodiment shown in FIGS. 3 and 4. As shown in FIGS. 3 and 4, body 12 may be counterbored so that seals 28' may be inserted on opposite ends of an internally relieved spacer 30 which is held in place by spacer 32 and split lock ring 34. A plurality of suitable seals, such as O-rings 36, may be used to effect a fluid tight seal between spacer 30 and body 12.

The purpose of primary sealing means 26 is to effect a fluid tight seal between body 12 and mandrel 14 so as to prevent the high pressure drilling fluid inside the mandrel from passing through the annular space between the mandrel and the body. The present invention does not reside in the primary sealing means itself, and other types of sealing means may be used as the primary sealing means.

The present invention contemplates a secondary sealing means 38 in combination with primary sealing means 26 to provide a sequential dual action sealing system whereby the secondary sealing means is operable only after the primary sealing means has failed and the fluid flow rate past the primary sealing means has exceeded a predetermined magnitude.

Referring now to FIGS. 3 and 4 in particular there is shown an annular piston 40 slidably positioned in cylindrical annular chamber 19 between a first position at or near the lower end of chamber 19 as shown in FIG. 3 and a second position shown in FIG. 4. Piston 40 is provided with one or more orifices 42 in the form of a radial bore 44 and an internal spiral annular groove 46 so that minor leakage past primary sealing means 26 will pass through the piston, into the larger portion of chamber 19, and out a fluid outlet 48 in body 12, without overcoming the bias provided by compressed coil spring 50. However, once the leakage past the primary sealing means exceeds a predetermined magnitude, piston 40 will slide from its first position shown in FIG. 3 to its second position shown in FIG. 4. Under many conditions it may be unnecessary to use any spring biasing means since the effect of gravity on the piston may provide sufficient bias toward the first position.

When piston 40 reaches its second position a fluid tight seal is once again established by inner and outer seals 52 and 54, which may be of the type previously discussed, and seal 56 between piston 40 and piston 20, which may be an O-ring. When piston 40 is in its second position, fluid outlet 48 is once again sealed off.

It should be noted that, with the use of orifice 42, seals 52, 54, and 56 are not subjected to any substantial pressure load until primary sealing means 26 has failed to the point where leakage is significant. Thus, secondary sealing means 38 is held in reserve until it must be used, thereby providing a sequential dual action sealing system having a long useful life.

One advantage of the present invention, unique to its use in a shock absorbing subassembly, centers around the primary sealing means. Without the use of the primary sealing means, the pressure inside the mandrel is exposed to the floating seal which has a substantial transverse area, thereby producing a large force tending to compress the dampening element and the shock absorbing subassembly. Using the primary sealing means, the pressure inside the mandrel is exposed to a much smaller transverse area, thereby producing a lower compression force for the same internal pressure. Thus, use of the primary sealing means enables the shock absorbing subassembly to be used at high drilling fluid pressures.

Obviously, numerous modifications and variations of the present invention are possible in the light of the present invention. In particular, it should be apparent that the sequential dual action sealing system of the present invention may be useful in (a) downhole tools other than the illustrated shock absorbing subassembly and (b) apparatus other than downhole tools in which it is desirable or necessary to provide a liquid tight seal of a long life between two telescoping tubular members, especially when there is relative axial movement between the members. Similarly it should be apparent that the orifice might exist in a different form or, if small leakages are not desired, there may be no orifice at all. It is therefore to be understood that, within the scope of the appended claims, the invention may be practiced otherwise than as specifically described herein.

What is claimed as new and desired to be secured by Letters Patent of the United States is:

1. A dual action sealing system comprising
   a female cylindrical member;
   a male cylindrical member having one end thereof inserted into said female cylindrical member, thereby forming an annular fluid passageway in communication with the interior of said male cylindrical member;
   said female cylindrical member having an internal annular groove longitudinally surrounding a portion of said male cylindrical member, thereby forming an annular cylindrical chamber defined by said male and female cylindrical members, said annular cylindrical chamber being in fluid communication with the interior of said male cylindrical member by means of said annular fluid passageway;
   said female cylindrical member also having a fluid outlet from said annular cylindrical chamber through said female cylindrical member, said fluid outlet being positioned remotely from the annular chamber end nearest the male cylindrical member end inserted into said female cylindrical member;
   primary annular seal means positioned between said male and female members for sealing said annular fluid passageway; and
   secondary annular seal means positioned in said annular cylindrical chamber, said secondary seal means comprising
      an annular piston slidably positioned in said annular cylindrical chamber between first and second positions proximate and remote from the annular chamber end nearest the male cylindrical member and inserted into said female cylindrical member,
      inner and outer annular seals positioned between said annular piston and said male and female cylindrical members, respectively,
      said annular piston means being provided with an orifice to facilitate low fluid flow rates therethrough into said annular cylindrical chamber and through said fluid outlet without causing said piston to move from said first position to said second position, and
      orifice seal means positioned in said annular cylindrical chamber for sealing said orifice when said piston is in said second position.

2. The dual action sealing system of claim 1 further comprising biasing means for biasing said annular piston toward said first position.

3. The dual action sealing system of claim 2 wherein said biasing means comprises a compressed coil spring.

4. The dual action sealing system of claim 1 where said orifice seal means comprises an O-ring positioned to engage said annular piston when it is in said second position.

5. The dual action sealing system of claim 1 where said female and male cylindrical members comprise a body and a mandrel, respectively, of a shock absorbing subassembly for use in an oil well drilling string.

* * * * *